Oct. 14, 1924.

G. F. MONTAGUE

RECEPTACLE

Filed Sept. 8, 1923  2 Sheets-Sheet 1

1,511,817

INVENTOR
George F. Montague
BY
his ATTORNEYS

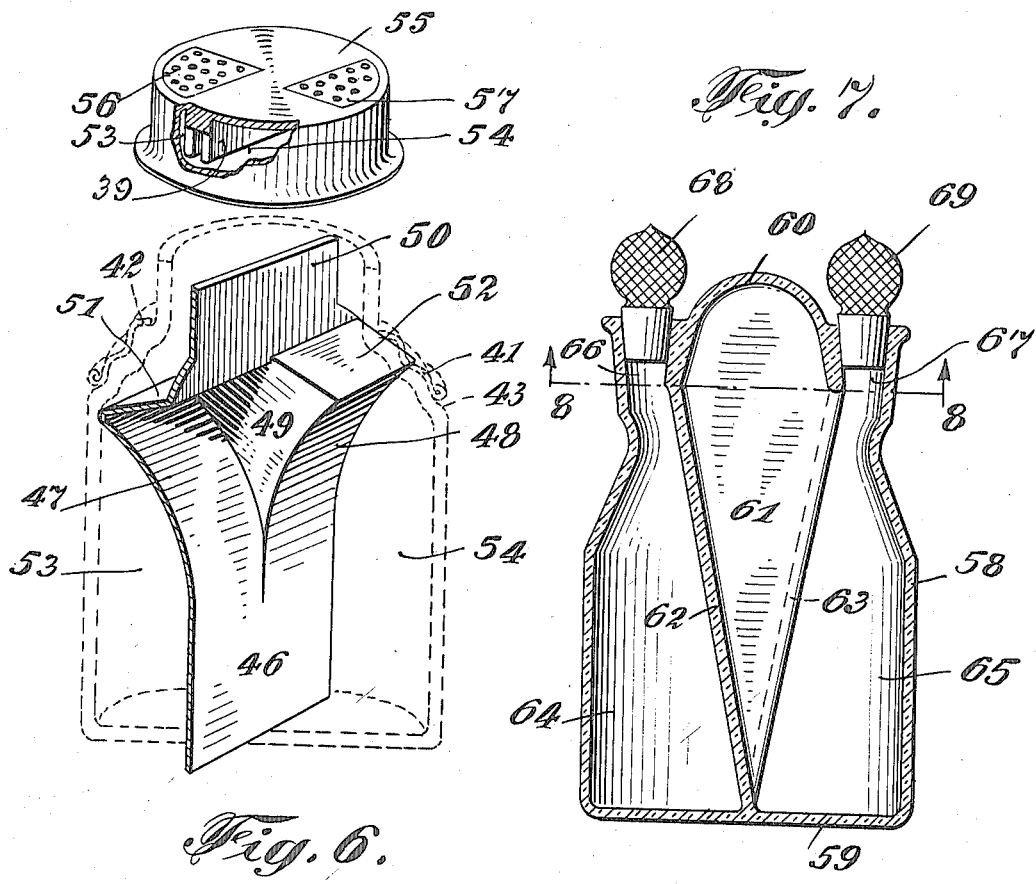
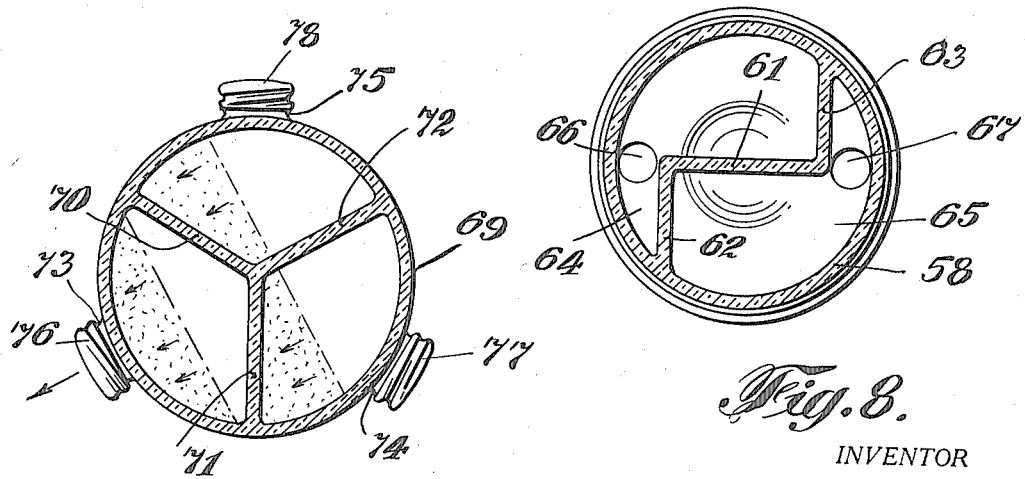

Patented Oct. 14, 1924.

1,511,817

UNITED STATES PATENT OFFICE.

GEORGE F. MONTAGUE, OF NEW YORK, N. Y.

RECEPTACLE.

Application filed September 8, 1923. Serial No. 661,546.

*To all whom it may concern:*

Be it known that I, GEORGE F. MONTAGUE, a citizen of the United States, residing in the borough of Manhattan, city, county, and State of New York, have invented an Improvement in Receptacles, of which the following is a specification.

My present invention relates to an improvement in receptacles and more particularly to that class of receptacles in which a unit is provided with a plurality of compartments or chambers each adapted to receive and hold a commodity or substance and from which unit any one of the substances contained therein may be dispensed therefrom separately. The invention therefore is adapted, for example, to serve as a condiment holder for pepper, salt or similar substances, or to serve as a container for different liquids. For example as a combined cruet for vinegar, oil, or similar liquid substances, or for another example as a perfume bottle for containing different perfumes which may be kept on a dresser.

I am aware that heretofore condiment holders, for example, have been constructed so as to include a plurality of compartments. In such structures, however, difficulty has been experienced in dispensing one article without also causing or permitting more or less of another article to escape from the holder, and the object of my present invention is to overcome this difficulty. In so doing, and in carrying out the invention, the receptacle made in accordance therewith comprises a body member having a partition dividing the interior thereof into a plurality of compartments or chambers, the body member having a plurality of openings corresponding in number with the number of chambers into which its interior is divided and the partition wall being inclined longitudinally of the body member so as to provide a pocket into which the substance whether powdered or liquid in one chamber is permitted to flow when the substance from another chamber is dispensed from the receptacle so as to obviate the possibility of the substance in the first chamber leaving the receptacle when the substance in the second chamber is dispensed therefrom, and the receptacle made in accordance with my invention will be hereinafter more particularly described.

In the drawing:

Fig. 6 is a diagrammatic elevation illustrating another form of the invention.

Fig. 7 is a central longitudinal section showing a still further form of the invention.

Fig. 8 is a section on line 8—8, Fig. 7, and

Fig. 9 is a section illustrating a modified form of the invention.

Figure 1:
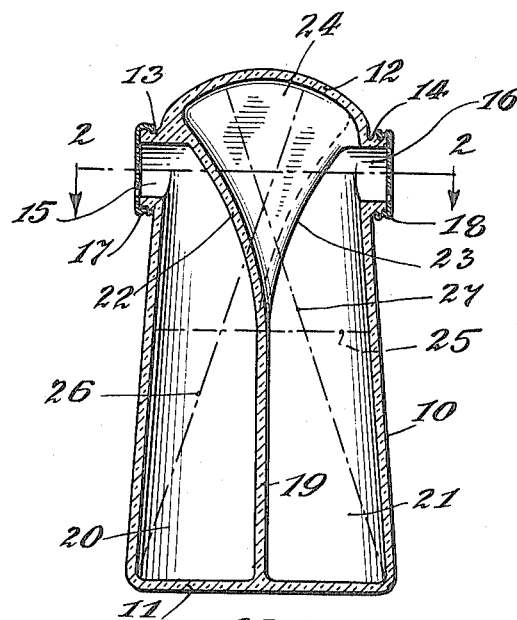
Fig. 1 is a central longitudinal section of a receptacle made in accordance with my present invention.
Figure 2:
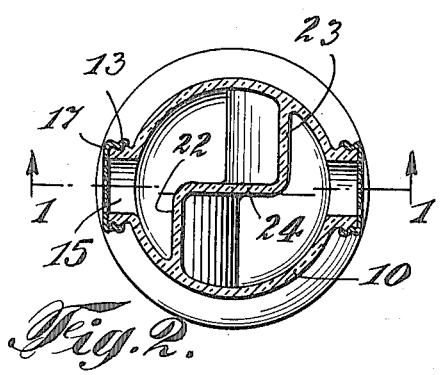
Fig. 2 is a section on line 2—2, Fig. 1.

Referring to the drawing and particularly to Figs. 1 and 2, the receptacle made in accordance with this invention may include a body member made of glass, metal or any other similar material and having side walls 10, a base or bottom 11 and a top wall 12. In this structure the side walls 10 adjacent the upper end of the body are provided with oppositely disposed screw threaded bosses 13 and 14 making provision for the openings 15 and 16. Removably connected to the bosses 13 and 14 are suitable caps 17 and 18. These caps are screw threaded to be turned down on the bosses and are preferably provided with a plurality of apertures through which material from the receptacle may be dispensed.

The body member is provided with a partition wall 19 dividing the same into compartments 20 and 21. The partition wall 19 extends upwardly from the base 11 and approximately midway of the longitudinal length of the receptacle diverges in oppositely disposed directions toward the openings 15 and 16. These diverging portions of the partition wall are indicated at 22 and 23 and are connected by a partition wall 24 extending between the same and transversely to the partition wall 19. It will be understood that the diverging portions of the partition wall 19 may be curved as indicated in these figures of the drawing or inclined in any suitable manner and that the transverse partition wall 24 may be placed in a substantially central position in the body member as indicated or otherwise. In any event the partition walls as illustrated and described provide pockets in the compartments of the receptacle to permit the material placed in one pocket. for example, to assume a position distant from the opening in said pocket when it is desired to obtain a quantity of material from the other pocket. Merely for the sake of illustration, it may be assumed that the receptacle shown in these figures of the drawing is a salt and pepper shaker, and that the compartment 20 contains salt and the compartment 21 contains pepper. Normally these materials are placed to a level indicated at approximately the dotted line 25, that is when the the receptacle is resting on its base the line 25 indicates approximately the height of the normal position of the materials placed in the compartments. Assuming furthermore that it is desired to obtain a quantity of salt the shaker is placed in a position in which the opening 15 leading from the compartment 20 is lowermost with the opening 16 leading from the compartment 21 uppermost. In this position the salt will flow to the opening 15 and obtained through the cap 17 by shaking the receptacle, whereas the pepper in the compartment 21 will assume a position approximately indicated by the line 27 so that there is little, if any, likelihood of any of the pepper being shaken through the cap 18. In a similar manner when it is desired to obtain pepper from the compartment 21 the shaker is held in the opposite position and the salt in the compartment 20 assumes a position approximately indicated by the dotted line 26 so that that portion of the salt adjacent the opening in the salt compartment is removed from the opening and there is little, if any, likelihood of any salt being shaken therefrom.

Figure 3:
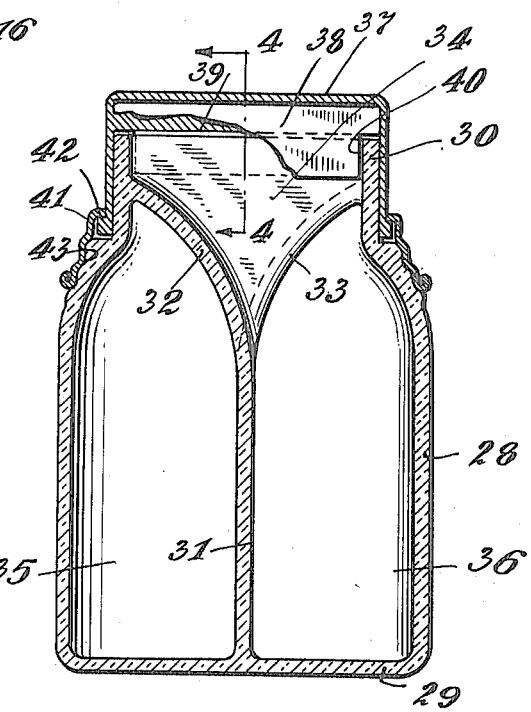
Fig. 3 is a view similar to Fig. 1 showing another form of the invention.
Figure 4:
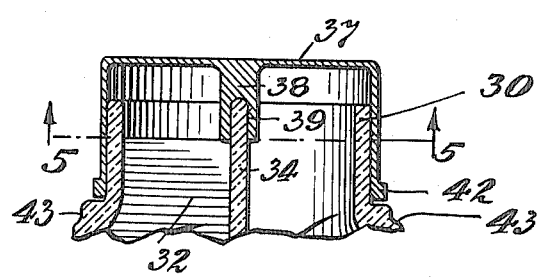
Fig. 4 is a section on line 4—4, Fig. 3.
Figure 5:
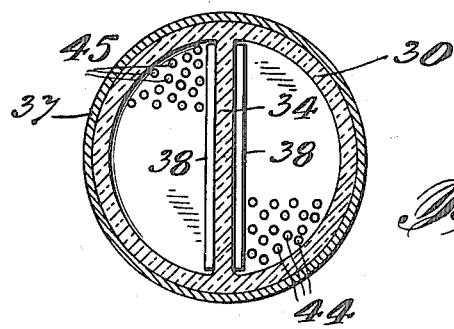
Fig. 5 is a section on line 5—5, Fig. 4.

Referring to Figs. 3, 4 and 5, the receptacle made in accordance with my invention is one in which the openings to the compartments are at the upper end and the device is provided with caps through which the materials contained in the several compartments may be separately dispensed. In these figures of the drawing the side walls of the receptacle are indicated at 28. The bottom of the receptacle is indicated at 29 and the upper open end of the receptacle is indicated at 30. In this instance the interior of the receptacle is provided with a partition wall 30, the upper ends thereof being inclined as indicated at 32 and 33 and connected by a partition wall 34 extending between the same in a position transverse to the partition wall 31, the inclined portions 32 and 33 of the partition wall extending into the reduced end or neck of the receptacle and the transverse partition wall 34 extending to the outer end of the neck so that the edge thereof is substantially flush with the edge or outer end of the neck. These partition walls divide the interior of the receptacle into compartments indicated at 35 and 36.

In this structure I employ a cap 37 which may be made of metal or any other suitable material and is adapted to fit over the neck of the receptacle. Interiorly the cap is provided with a transverse rib 38, the inner edge of which is recessed as indicated at 39 so as to receive the upper end of the transverse partition wall 34, and the end portions of the transverse rib 38 are notched as indicated at 40 to receive the outer end of the neck of the receptacle when the cap member 37 is placed in position thereon. The cap 37 is held in position on the neck of the bottle by means of a suitable ring or otherwise. As indicated in these figures of the drawing I employ a screw threaded ring 41 adapted to engage a shoulder 42 on the cap 37 and also to engage the adjacent screw threaded portion 43 on the outer surface of the body of the receptacle. The cap 37 in suitable oppositely disposed positions is provided with series of apertures indicated at 44 and 45, the former when the cap is in position making it possible to shake pepper or salt or other similar powdered material from the compartment 35 in the receptacle and the latter making it possible to shake material from the compartment 36 of the receptacle.

By reference to Fig. 6, it will be seen that in some instances, particularly where the material to be used is especially light and fine it may be advisable to employ a modified form of partition wall construction. In this instance, the lower or inner end of the partition wall is shown at 46 and the curved or inclined portion thereof at 47 and 48. These inclined portions 47 and 48 of the partition wall extend approximately to the neck of the receptacle and are connected by the transverse partition wall 49 which is similar to the structures hereinbefore described. In this instance, however, there is an additional partition wall 50 substantially parallel to the lower portion of the partition wall 46 and consequently transverse to the partition wall 49, and in addition there are also partition walls 51 and 52, the former extending from the outer end of the inclined portion 47 of the partition wall 46 to the partition wall 50 and the latter in a corresponding position relatively to the inclined portion 48 of the partition wall 46 and the partition wall 50, it being understood that the inner edges of the partition walls 51 and 52 are connected to the adjacent portions of the partition wall 49. In this instance the receptacle is divided by the partition walls into compartments 53 and 54, and the cap member 55 is provided with a transverse recessed rib to receive the upper end of the partition wall 50 and also with sets of apertures indicated at 56 and 57 from which respectively material from the compartments 53 and 54 may be shaken.

It will be understood that the invention in the present case is not limited to a receptacle adapted for use as a condiment shaker, because obviously it may be employed as a receptacle for cologne, toilet water or other liquid substances. As shown in Figs. 7 and 8 when the receptacle is adapted to contain liquid substances the same may be made of suitable material to comprise side walls 58, a bottom or base 59 and a top wall 60. In this instance the interior of the receptacle is provided with a partition wall 61 placed transversely therein and having inclined portions 62 and 63 dividing the receptacle into compartments indicated at 64 and 65. In this structure the upper portion of the body is provided with openings 66 and 67 adapted to receive stoppers 68 and 69 which, as will be understood, may be ground in the openings 66 and 67 to make the stoppers tight in instances where this is necessary. The opening 66 in this construction forms an outlet from the compartment 64 and the opening 67 an outlet from the compartment 65. It will be understood, of course, that the article shown in Figs. 7 and 8 may be utilized for toilet water, as hereinbefore stated, or for oil and vinegar or for various other and obvious purposes.

The various forms of the invention as hereinbefore described have referred merely to a receptacle divided by the partition walls into two compartments, but it is to be understood that the invention is in no wise so limited as the number of compartments may be increased if desired. For example, as shown in Fig. 9, the receptacle may comprise a body member having side walls 69 and the interior thereof divided, for example, into three compartments by partition walls 70, 71 and 72. In suitable positions the wall 69 in this structure may be provided with bosses 73, 74, 75 fitted respectively with caps 76, 77 and 78 through which material contained in any compartment may be dispensed without removing the material contained in either of the other compartments. It will be understood in this structure that the partition walls may be provided with curved or inclined portions similar to those shown and described in connection with the other forms of the invention and for the same purpose, namely to provide pockets into which material in the compartment other than that from which it is desired to obtain material are permitted to flow to enable the user to obtain material from any one compartment without obtaining material from any of the others.

In some instances the objects of my invention may be attained by the use of a straight or substantially straight partition wall placed in a suitable position either longitudinally and centrally disposed or at an inclination to the longitudinal axis of the receptacle and extending from one end thereof to the other in which event the pocket feature is provided by placing the openings from which the materials from the compartments may be dispensed in oppositely disposed positions adjacent the opposite sides of the partition wall, that is to say the dispensing apertures in one compartment are placed adjacent the edge of the partition wall at one side thereof and the corresponding openings from the other compartment are placed adjacent the opposite edge of the partition wall and on the opposite side thereof.

I claim as my invention:

1. A receptacle of the class described comprising a body member, a partition wall extending interiorly across the body member and for an appreciable distance from one end thereof, a second partition wall extending across the body member at the other end thereof transversely and at substantially right angles to the aforesaid partition wall, and inclined partition walls extending from and forming continuations of the first aforesaid partition wall and connecting the same with the second aforesaid partition wall to divide the interior of the body member into compartments and to form a pocket forming part of each compartment and into which material in one compartment is adapted to flow when material from another compartment is dispensed from its own compartment.

2. A receptacle of the class described comprising a body member having oppositely disposed discharge openings adjacent one end thereof, a partition wall extending transversely across the body member interiorly thereof and for an appreciable distance from the other end thereof, a second partition wall extending transversely across the discharge opening end of the body member and at substantially right angles to the first aforesaid partition wall, and inclined walls branching and extending from the first aforesaid partition wall and connecting the same with the second aforesaid partition wall for dividing the interior of the body member into compartments and forming a pocket in each compartment adjacent the discharge opening in the other compartment so that when material is discharged from one compartment the material in the other compartment flows into the pocket therein and away from the discharge opening thereof.

3. A receptacle of the class described comprising a body member having discharge openings adjacent the top thereof and in oppositely disposed positions, a partition wall extending transversely across the interior of the body member and extending an appreciable distance from the lower end thereof, a second partition wall extending transversely across the upper end of the compartment between the discharge openings in the body member and at substantially right angles to the aforesaid partition wall, and inclined walls forming extensions of the first aforesaid partition wall and connecting the same with the second aforesaid partition wall to divide the interior of the body member into two compartments each having a pocket at the upper end of the body member adjacent the discharge opening in the other compartment so that when material is discharged from one compartment the material in the other compartment flows into the pocket therein and away from the discharge opening thereof.

4. A receptacle of the class described comprising a body member having an open top, means for closing the open top of the body member and through which materials contained in the body member may be dispensed, a partition wall extending transversely across the interior of the body member an appreciable distance from the lower end thereof, a second partition wall extending across the body member in the upper portion thereof at substantially right angles to the aforesaid partition wall, inclined walls forming extensions of the first aforesaid partition wall and connecting the same with the second aforesaid partition wall, a third partition wall substantially parallel with the first aforesaid partition wall and extending from the upper end of the second aforesaid partition wall to the open end of the body member, and inclined walls extending between and connecting the lower portion of the third aforesaid partition wall and the upper ends of the said inclined walls to divide the interior of the body member into two compartments each having a pocket therein adjacent the open end thereof in order that when material is dispensed from one compartment the material in the other compartment flows into the pocket associated therewith and away from the discharge opening thereof.

5. A receptacle of the class described comprising a body member having an open neck at the upper end thereof, means for closing the open end of the neck of the body member, a partition wall extending across the interior of the body member an appreciable distance from the lower end thereof, a second partition wall extending across the interior of the body member directly below the neck thereof in a transverse position at substantially right angles to the first aforesaid partition wall, inclined walls forming extensions of the first aforesaid partition wall and connecting the same with the second aforesaid partition wall, a third partition wall substantially parallel to the first aforesaid partition wall extending from the upper end of the second aforesaid partition wall and transversely across the neck of the body member, and inclined walls extending from the lower portions of the third aforesaid partition wall to the upper ends of the aforesaid inclined walls forming compartments within the body member and the neck thereof with a pocket in each compartment so that when material is dispensed from one compartment the material in the other compartment flows into the pocket thereof and away from its discharge opening.

6. A receptacle of the class described comprising a body member having an open neck at the upper end thereof, a cap fitting over the neck of the body member for closing the same and provided with spaced discharge openings therein, means for securing the cap in position on the neck of the body member, ribs extending transversely across the interior of the cap, a partition wall extending across the interior of the body member and extending an appreciable distance from the lower end thereof, a second partition wall extending across the interior of the body member directly below the neck thereof in a transverse position at substantially right angles to the first aforesaid partition wall, inclined walls forming extensions of the first aforesaid partition wall and connecting the same with the second aforesaid partition wall, a third partition wall substantially parallel to the first aforesaid partition wall extending from the upper end of the second aforesaid partition wall and transversely across the neck of the body member and at its upper edge extending between the transverse ribs of the said cap, and inclined walls extending from the lower portions of the third aforesaid partition wall to the upper ends of the aforesaid inclined walls forming compartments within the body member and the neck thereof with a pocket in each compartment so that when material is dispensed from one compartment the material in the other compartment flows into the pocket thereof and away from its discharge opening.

7. A receptacle of the class described comprising a body member having an open neck at the upper end thereof, a cap fitting over the neck of the body member for closing the same and provided with spaced discharge openings therein, a ring extending over a flange on the cap and adapted to engage the walls of the body member exteriorly thereof to maintain the cap in position on the neck, ribs extending transversely across the interior of the cap, a partition wall extending across the interior of the body member an appreciable distance from the lower end thereof, a second partition wall extending across the interior of the body member directly below the neck thereof in a transverse position at substantially right angles to the first aforesaid partition wall, inclined walls forming extensions of the first aforesaid partition wall and connecting the same with the second aforesaid partition wall, a third partition wall substantially parallel to the first aforesaid partition wall extending from the upper end of the second aforesaid partition wall and transversely across the neck of the body member and at its upper edge extending between the transverse ribs of the said cap, and inclined walls extending from the lower portions of the third aforesaid partition wall to the upper ends of the aforesaid inclined walls forming compartments within the body member and the neck thereof with a pocket in each compartment so that when material is dispensed from one compartment the material in the other compartment flows into the pocket thereof and away from its discharge opening.

Signed by me this 27th day of August, 1923.

GEORGE F. MONTAGUE.